(12) United States Patent
Tangen

(10) Patent No.: US 6,874,050 B2
(45) Date of Patent: Mar. 29, 2005

(54) CIRCUIT AND METHOD FOR EXPANDING A SERIAL BUS

(75) Inventor: Wayne A. Tangen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

(21) Appl. No.: 10/051,478

(22) Filed: Jan. 16, 2002

(65) Prior Publication Data

US 2003/0135679 A1 Jul. 17, 2003

(51) Int. Cl.$^7$ .............................................. G06F 13/00
(52) U.S. Cl. ........................ 710/300; 710/107; 710/316
(58) Field of Search ................................. 710/300, 107, 710/108, 110, 305, 313, 316, 317; 713/300, 330; 307/116, 130

(56) References Cited

U.S. PATENT DOCUMENTS

| | | | |
|---|---|---|---|
| 5,526,497 A | * 6/1996 | Zilka et al. ................. | 710/316 |
| 6,092,138 A | * 7/2000 | Schutte ....................... | 710/113 |
| 6,233,635 B1 | * 5/2001 | Son ............................ | 710/315 |
| 6,253,268 B1 | * 6/2001 | Bjorkengren et al. ....... | 710/105 |
| 6,301,623 B1 | * 10/2001 | Simpson et al. ............ | 709/253 |
| 6,339,806 B1 | * 1/2002 | Foster et al. ................ | 710/313 |
| 6,438,624 B1 | * 8/2002 | Ku et al. ........................ | 710/9 |
| 6,622,188 B1 | * 9/2003 | Goodwin et al. ........... | 710/105 |
| 2001/0029554 A1 | * 10/2001 | Namba .......................... | 710/9 |

OTHER PUBLICATIONS

The 12C–Bus Specification, Version 2.1, Jan. 2000.*
The 12C–Bus Specification; Version 2.1; Jan. 2000: Philips Semiconductors; pp. 1–46.
Philips Semiconductors 12C–bus; About the 12C–bus; http://www–us2.semiconductors.philips.com/i2c/facts/; Oct. 22, 2001; pp. 1–3.
Rymenants, Sven, "The Electronic Pages", published at http://www.geocities.com/Silicon Valley/9504/mic_bo01.htm at least as early as Apr. 11, 2001, actual date unknown.
Rymenants, Sven, "The Electronic Pages", published at http://www.geocities.com/SiliconValley/9504/mic_b0O2.htm at least as early as Apr. 11, 2001, actual date unknown.
Author Unknown, "Philips Semiconductors—12C–bus", published at http://www.semiconductors.philips.com/i2c/, Jan. 1, 2001.

* cited by examiner

Primary Examiner—Sumati Lefkowitz
Assistant Examiner—Trisha Vu

(57) ABSTRACT

A serial bus expansion circuit, system, and method are provided. In one embodiment, the serial bus expansion circuit comprises a bus distribution circuit selectively coupling a serial bus to one of a number of serial bus outputs. The serial bus expansion circuit also includes a distribution controller having a control output coupled to a control input of the bus distribution circuit, and, a number of power-up pull resistors coupling each of the serial bus outputs to a power-up pull source.

14 Claims, 3 Drawing Sheets

CIRCUIT AND METHOD FOR EXPANDING A SERIAL BUS

TECHNICAL FIELD

The present invention is generally related to the field of data communications and, more particularly, is related to a system and method for expanding a serial bus.

BACKGROUND OF THE INVENTION

In consumer electronics, telecommunications, and industrial electronics, there are often many similarities between seemingly unrelated designs. For example, nearly every system includes some intelligent control such as a single integrated circuit (IC) microcontroller. Such systems may also include general-purpose circuits like liquid crystal display drivers, remote input/output ports, memory devices, or data converters, etc.

To exploit the similarity in system components and other characteristics to the benefit of both systems designers and equipment manufacturers, as well as to maximize hardware efficiency and circuit simplicity, a simple bi-directional two wire bus for efficient Inter-IC control was developed by Philips Semiconductors™ headquartered in Eindhoven, The Netherlands having operations throughout the world. The Inter-IC ($I^2C$) bus is outlined in the $I^2C$-Bus Specification, Version 2.1, January 2000, promulgated by Philips Semiconductors™, such specification being incorporated herein by reference in its entirety.

The $I^2C$ Specification provides for the coupling of multiple devices including at least one master device and a number of slave devices to a two wire serial bus to facilitate serial data communications there between. A unique address is assigned to each slave device so that each slave device may be identified by the master device to facilitate serial communications therewith, etc. However, the number of devices that may be included on the serial bus is limited to the number of available addresses.

SUMMARY OF THE INVENTION

In view of the foregoing, a serial bus expansion circuit, system, and method are provided. In one embodiment, the serial bus expansion circuit comprises a bus distribution circuit selectively coupling a serial bus to one of a number of serial bus outputs. The serial bus expansion circuit also includes a distribution controller having a control output coupled to a control input of the bus distribution circuit, and, a number of power-up pull resistors coupling each of the serial bus outputs to a power-up pull source.

In another embodiment, a system for serial bus expansion is provided that comprises means for selecting one of a number of devices to be coupled to a serial bus, wherein each of the devices is capable of communicating on the serial bus, means for selectively coupling the serial bus to one of the number of devices, and, means for sequentially pulling a voltage potential of each of a number of serial bus inputs of the respective devices to a predefined source voltage potential and then to a predefined common voltage potential upon an occurrence of a system power-up condition.

In still another embodiment, a serial bus expansion method is provided that comprises the steps of providing a bus distribution circuit to selectively couple a serial bus to one of a number of serial bus outputs; determining a select one of the serial bus outputs to which the serial bus is to be coupled; controlling the bus distribution circuit to couple the serial bus to the select one of the serial bus outputs; and providing a number of power-up pull resistors that couple each of the serial bus outputs to a power-up pull source.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
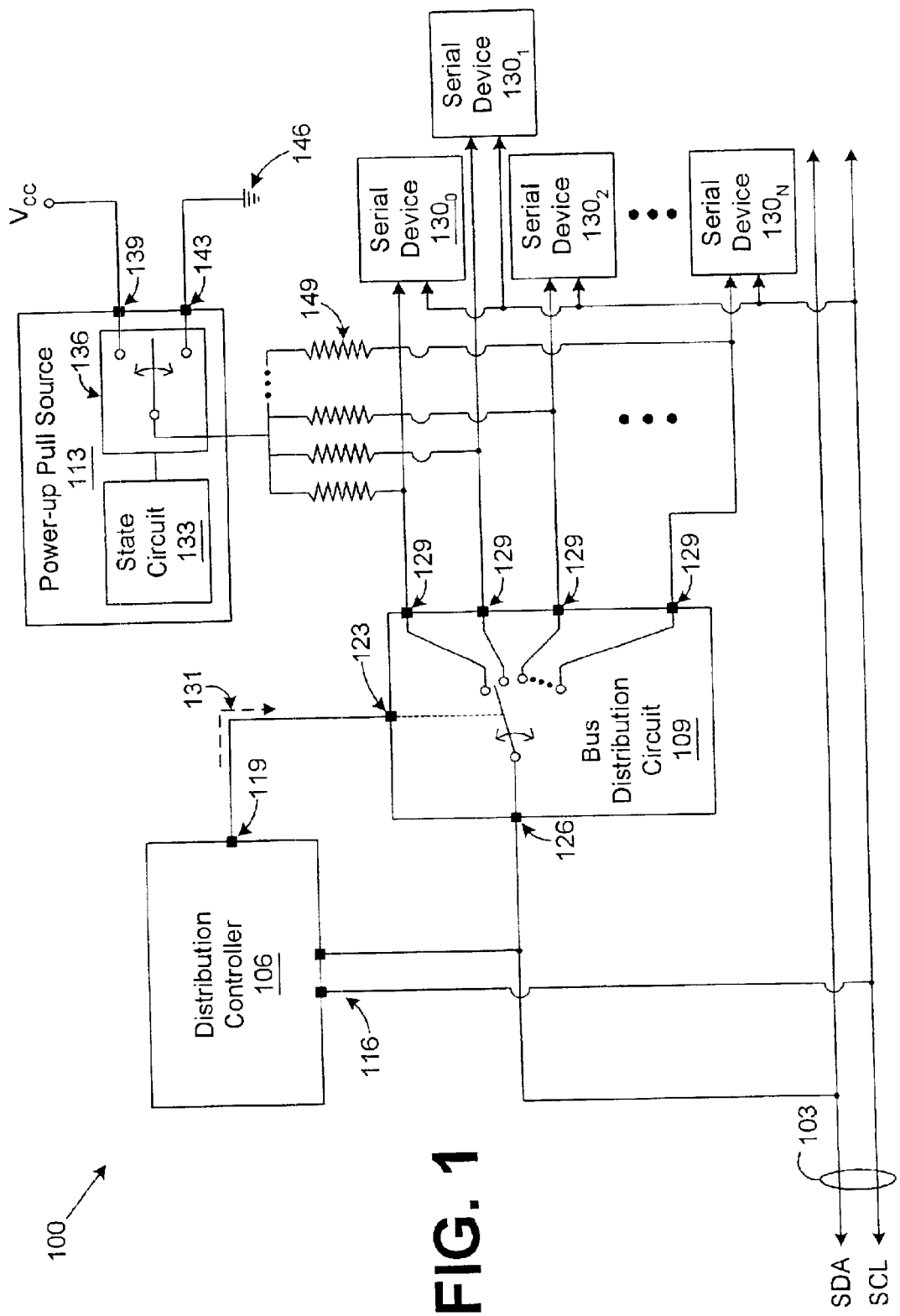
FIG. 1 is a schematic of a serial bus expansion circuit according to an embodiment of the present invention.

With reference to FIG. 1, shown is a serial bus expansion circuit 100 according to an embodiment of the present invention. The serial bus expansion circuit 100 is electrically coupled to a serial bus 103 that facilitates serial data communication between a number of independent devices as set forth in the $I^2C$-Bus Specification, Version 2.1, January 2000, the entire content of which is incorporated herein by reference. The serial bus 103 includes two conductors, namely, a serial data line SDA and a serial clock line SCL as is set forth in the above-referenced specification. A unique address is associated with each device coupled to the serial bus 103 as can be appreciated by those with ordinary skill in the art. In cases where the number of devices coupled to the serial bus 103 exceeds the number of available addresses, then the serial bus expansion circuit 100 provides for the coupling of multiple devices that share the same address to the serial bus 103.

The serial bus expansion circuit 100 includes a distribution controller 106, a bus distribution circuit 109, and a power-up pull source 113. The distribution controller 106 includes a serial bus input 116 for coupling to the serial data line SDA and the serial clock line SCL. The distribution controller 106 also includes a control output 119 that is coupled to a control input 123 of the bus distribution circuit 109. The bus distribution circuit 109 includes a serial bus input 126 to which the serial data line SDA is coupled. The bus distribution circuit 109 also includes a number of serial bus outputs 129, each of the serial bus outputs 129 being adapted for coupling to a respective serial device $130_{0-N}$. The bus distribution circuit 109 may have any number serial bus outputs 129 to accommodate a respective number of the serial devices $130_{0-N}$.

In this respect, the bus distribution circuit 109 may comprise, for example, a multiplexer or other appropriate circuit. The bus distribution circuit 109 thus acts as a switch that couples the serial bus input 126 to a respective one of the serial bus outputs 129 based upon a control signal 131 applied to the control input 123. The control input 123 and control output 119 may comprise a multiple conductor inputs and outputs to accommodate a parallel bus therebetween. In such case, the control signal 131 would be a parallel signal. Alternatively, serial communication can be established between the distribution controller 106 and the bus distribution circuit 109 to communicate the control signal 131 therebetween to control the state of the bus distribution circuit 109 in coupling the serial data line SDA to one of the serial bus outputs 129.

The power-up pull source 113 includes a state circuit 133 and a switch circuit 136. The state circuit 133 controls the state of the switch circuit 136. In this respect, the switch circuit 136 maybe, for example, a transistor or other type of switch circuit. The switch circuit 136 includes a source voltage input 139 that is coupled to a source voltage $V_{cc}$. The switch circuit 136 also includes a second input 143 that is coupled to a common voltage 146. The common voltage 146 may be, for example, a chassis ground connection or other common voltage source having a zero voltage potential as set forth in the I²C-Bus Specification. Alternatively, the common voltage 146 may be another voltage potential that represents a relative low voltage value. The output of the switch circuit 136 is coupled to a number of power-up pull resistors 149 that are in turn coupled to a respective one of the serial bus outputs 129 as shown. In this respect, the power-up pull source 113 controls the voltage seen on the respective serial bus outputs 129 during power-up as will be discussed.

The serial clock line SCL is coupled to all devices as well as to the distribution controller 106 to provide a time reference by which serial information may be communicated via the serial data line SDA. In addition, the serial communication via the serial data line SDA is controlled by one or more master devices or various slave devices coupled thereto. In conducting serial communication via the serial data line SDA, these devices are capable of pulling voltage on the serial data line SDA to a relative low voltage representing a logical "0" as is set forth in the I²C-Bus Specification, Version 2.1, January 2000 as referenced above. This may be done, for example, when a device couples the serial data line SDA to the common voltage 146. The I²C-Bus Specification also specifies external pull sources that act as pull-up sources pulling the voltage on the serial data line SDA to a relative high voltage that represents a logical "1". The external pull sources may be, for example, external pull resistors coupled between an external voltage source (not shown) and the serial data line SDA or constant current sources coupled to the serial data line SDA. In either case, when no device couples the serial data line SDA to a relative low voltage, the external pull sources pull the voltage potential on the serial data line to the relative high voltage. However, the effect of the external pull sources is overridden by the action of a device that couples the serial data line SDA to the common voltage 146. The actual values of the high and low voltages employed that represent the logical values may vary from circuit to circuit as can be appreciated by those with ordinary skill in the art.

In order to pull the voltage low on the serial data line SDA, the master or slave devices may act to couple the serial data line SDA to a common voltage 146. Otherwise, the voltage on the serial data line SDA is pulled to a relative high voltage by one or more external pull sources. The value of the resistance of the power-up pull resistors 149 is much greater than the value of any resistors employed as the external pull sources coupling an external voltage source to the serial bus 103. The specific value of the power-up pull resistors 149 is high enough relative to the value of any pull resistors employed in corresponding external pull sources (assuming that a current source is not employed as the external pull source) so that the external pull resistors can pull the voltage on the serial data line SDA to a relative high voltage when the power-up pull source 113 has coupled the power-up pull resistors 149 to the common voltage. In other words, the value of the power-up pull resistors 149 is large enough relative to any external pull resistors to allow a voltage potential placed on the serial data line SDA to be overridden by a voltage applied by the external pull sources and by any master or slave devices coupled to the serial bus 103 regardless of the state of the power-up pull switch 113.

Next, the operation of the serial bus expansion circuit 100 is described. The distribution controller 106 generates the control signal 131 that is applied to the control input 123 of the bus distribution circuit 109. The bus distribution circuit 109 responds by coupling the serial bus input 126 to a respective one of the serial bus outputs 129 that corresponds to the value of the control signal 131. Thus, the distribution controller 106 includes state circuitry that responds to a selection message received from a remote device (not shown) via the serial bus 103. The selection message is addressed to the distribution controller 106. The distribution controller 106 ultimately generates the control signal 131 that controls the toggling of the bus distribution circuit 109 to connect a selected one of the serial devices $130_{0-N}$ to the serial data line SDA. The distribution controller 106 generates the control signal 131 based upon a data payload in the selection message.

During power-up of the serial bus expansion circuit 100, the power-up pull source 113 prevents all of the serial bus outputs 129 from "floating" by coupling the source voltage $V_{cc}$ and/or the common voltage 146 to their respective serial bus outputs 129 through the power-up pull resistors 149. Specifically, the power-up pull source 113 first couples the power-up pull resistors 149 to the source voltage $V_{cc}$ during power-up. This applies a high voltage on all of the serial bus outputs 129 that is applied to the serial devices 130. Thereafter, the power-up pull source 113 causes the common voltage 146 to be applied to the power-up pull resistors 149. This causes a transition from high to low on each of the serial bus outputs 129 that is seen by each of the serial devices 130.

In the typical situation, the serial clock line SCL is in a high state during the power-up of the serial bus expansion circuit 100. Due to the high to low transition on the serial data line SDA caused by the power-up pull source 113, all of the serial devices 130 perceive a start condition as is set forth in the I²C-Bus Specification except for the serial device 130 actually coupled to the serial data line SDA through the bus distribution circuit 109 that may or may not perceive the start condition depending upon the state of the serial data line SDA. The respective serial device 130 that is coupled to the serial data line SDA through the bus distribution circuit 109 may then receive further data that is transmitted by a respective device on the serial bus 103. However, the remaining serial devices 130 coupled to the remaining serial bus outputs 129 that are not coupled to the serial data line SDA through the bus distribution circuit 109 continue to perceive the common voltage 146 due to the action of the power-up pull source 113. Thus, the voltage on these lines does not float and the serial devices 130 coupled thereto do not react to data communication over the serial data line SDA as they do not see the shared address or any other logical information beyond the logical zero imposed by the power-up pull source 113. Thus, these serial devices 130 ignore the logic zero that is maintained on the serial data line SDA while various clock pulses occur during the ordinary course of communication between other devices on the serial bus 103.

However, for some serial data circuits that employ the serial bus 103, a byte of zeros or other predefined value transmitted as the address value on the serial data line SDA sets a "general call condition" as is set forth, for example, in the I²C-Bus Specification. In a general call condition, all devices coupled to the serial bus 103 respond thereto. If the general call condition is triggered, for example, by a string of zeros in a predefined serial data circuit, then after power-up, the serial devices 130 not coupled directly to the serial data line SDA through the bus distribution circuit 106 will perceive a general call condition. This is because they see a string of zeros as the value on the serial bus outputs 129 not coupled to the serial data line SDA through the bus distribution circuit 109 is maintained in a low state after power-up. To address this problem, according to an aspect of the present invention, the serial devices 130 are configured so as not to respond to the general call condition if such condition is a string of zeros.

From time to time, the distribution controller 106 toggles the bus distribution circuit 109 so that a respective transmitting or receiving device coupled to the serial bus 103 may communicate with a different one of the serial devices 130 coupled to the serial bus outputs 129. The toggling of the bus distribution circuit 109 in this manner occurs during an acknowledge bit on the serial data line SDA during an acknowledge clock pulse by the serial clock line SCL.

Figure 2:
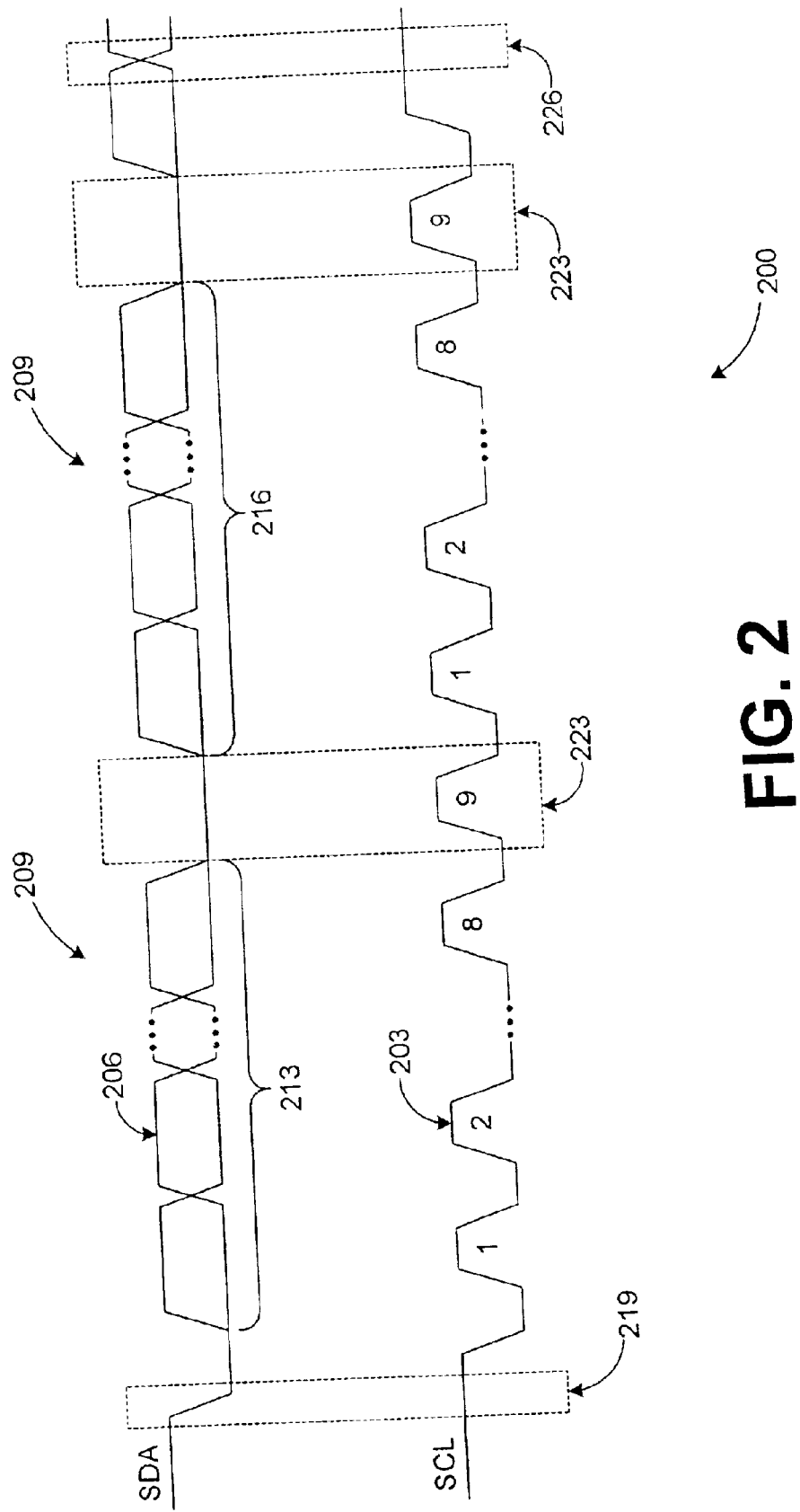
FIG. 2 is a timing diagram that depicts signals on a serial data line (SDA) and a serial clock line (SCL) in the serial bus expansion circuit of FIG. 1.

With reference to FIG. 2, shown is a timing diagram 200 that depicts the signals on the serial data line SDA and the serial clock line SCL with respect to time. As shown, a number of clock pulses 203 are generated on the serial clock line SCL by a respective master that is coupled to the serial bus 103. In synchronization with the clock pulses 203, the data bits 206 are transmitted on the serial data line SDA in individual bytes 209. The first byte 209 includes an address 213 and the second byte 209 comprises a data payload 216. At the left most end of the timing diagram 200 is a start condition 219 in which a transition from high to low occurs in the serial data line SDA while the serial clock line SCL is maintained in a high state as is set forth by the I²C-Bus Specification previously incorporated by reference. The start condition 219 informs all devices coupled to the serial bus 103 (FIG. 1) that an address 213 and a data payload 216 are forthcoming on the serial bus 103.

Depending on the address 213 transmitted, only one device on the serial bus 103 associated with such address will respond to the data in the payload 216. Although only two bytes 209 are shown, it is understood that the message may be any number of bytes long. After the transmission of each byte 209, an acknowledge bit 223 is provided that coincides with every ninth clock pulse. The acknowledge bit 223 provides an opportunity for a receiving device on the serial bus 103 to transmit an acknowledgement to the transmitting device via the serial data line SDA as is set forth in the I²C-Bus Specification. In particular, during the acknowledge bit 223 the transmitting device frees the serial data line SDA so that the receiving device may transmit an acknowledge pulse in coordination with the acknowledge clock pulse as is set forth in the I²C-Bus Specification. In this manner, the transmitting device knows that the byte 209 that was transmitted was successfully received by the receiving device via the serial bus 103.

The timing diagram 200 also includes a stop/restart condition 226 that is detected by an appropriate transition in the serial data line SDA while the serial clock line SCL is held high as is set forth in the I²C-Bus Specification. With respect to the serial bus expansion circuit 100, the address 213 indicates a message for the distribution controller 106 and the data payload 216 is interpreted by the distribution controller 106 to generate an appropriate control output 119 that selects a desired state of the bus distribution circuit 109 as will be discussed. The actual switching of the bus distribution circuit 109 by the application of an appropriate control output 119 thereto occurs, for example, during the acknowledge bit 223. This may be done, for example, so that any one of the serial devices 130 (FIG. 1) that are subsequently coupled to the serial data line SDA after a toggling of the bus distribution circuit 109 do not perceive an inadvertent start condition 219.

Figure 3:
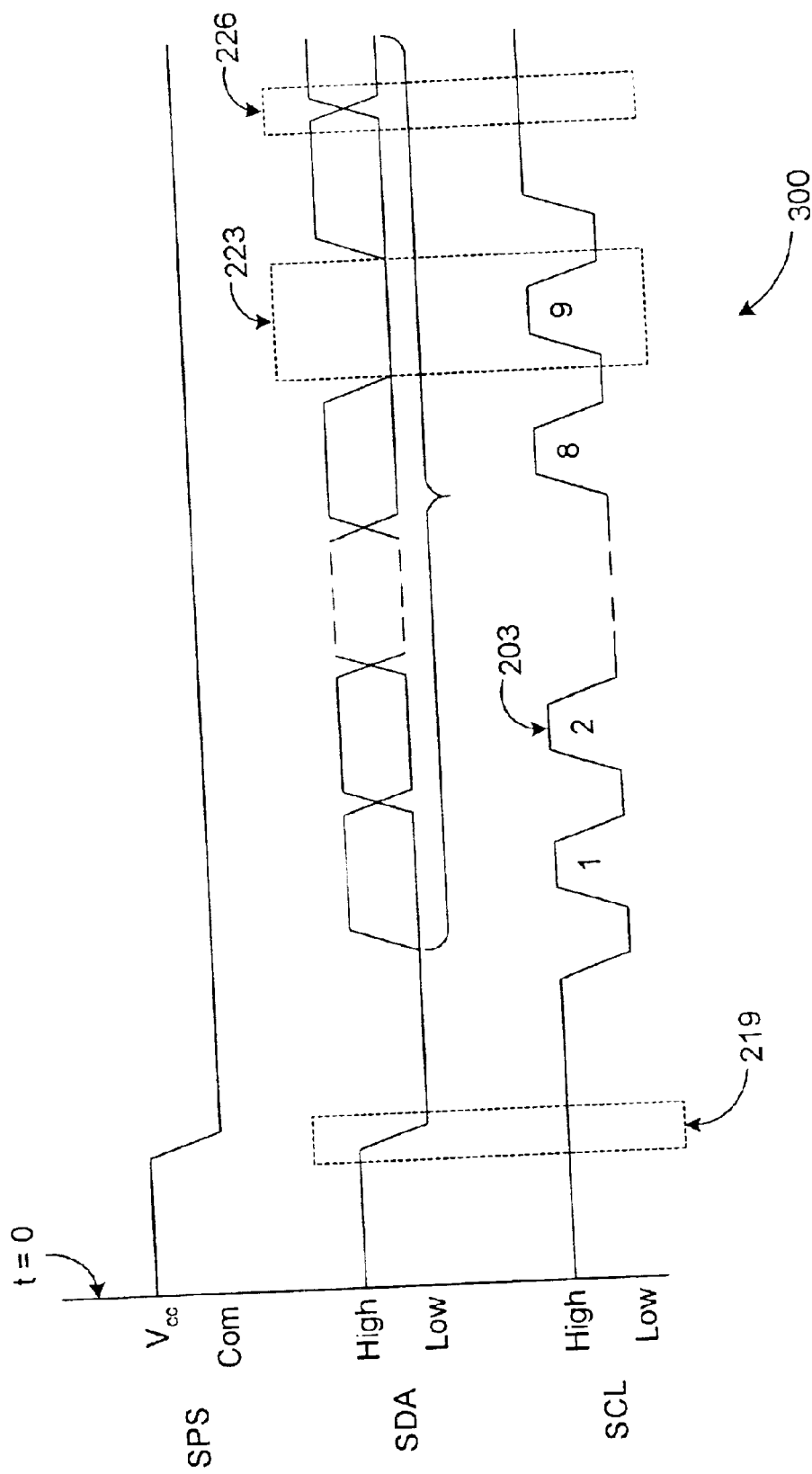
FIG. 3 is a timing diagram that depicts signals on a serial data line (SDA) and a serial clock line (SCL) relative to a state of a power-up pull source in the serial bus expansion circuit of FIG. 1.

With reference to FIG. 3, shown is second timing diagram 300 according to an aspect of the present invention. The timing diagram 300 depicts the operation of the power-up pull source 113 (FIG. 1) relative to signals on the serial data line SDA and the serial clock line SCL as shown. During power-up, the state circuit 133 in the power-up pull source 113 couples the source voltage $V_{cc}$ to the power-up pull resistors 149 (FIG. 1), thereby causing the serial bus outputs 129 to be pulled into a high state. In particular, the state circuit 133 (FIG. 1) places the switch circuit 136 (FIG. 1) in a first state that couples the source voltage $V_{cc}$ to the power-up pull resistors 149. Thereafter, the state circuit 133 in the power-up pull source 113 toggles the switch circuit 136 into a second state that couples the common voltage 146 to the power-up pull resistors 149 causing a transition of the serial bus outputs 129 to a low state with the exception of the serial bus output 129 that is coupled to the serial data line SDA through the bus distribution circuit 109. Specifically, the serial bus output 129 coupled to the serial data line SDA takes the value that is placed on the serial data line SDA. Assuming that the serial clock line SCL is in a high state, then a start condition 219 is observed by the remaining serial devices 130 coupled to the serial bus outputs 129. In addition, the switching of the power-up pull source 113 during power-up of the serial bus expansion circuit 100 should occur before a start condition occurs on the serial bus 103 to prevent data corruption.

Where a respective one of the serial devices 130 is coupled to the serial data line SDA by the bus distribution circuit 109, then subsequent communication by other devices coupled to the serial bus 103 transmitted thereto may include a restart condition where the serial data line SDA is controlled by a device beyond the serial bus expansion circuit 100. However, those serial devices 130 that are not coupled to the serial bus line SDA perceive a constant low state at their serial data line inputs and, consequently, they ignore all activity until the bus distribution circuit 109 is toggled to an appropriate position.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A serial bus expansion circuit, comprising:
    a bus distribution circuit selectively coupling a serial bus to one of a number of serial bus outputs;
    a distribution controller having a control output coupled to a control input of the bus distribution circuit; and
    a number of power-up pull resistors coupling each of the serial bus outputs to a power-up pull source, the power-up pull source including a state circuit that sequentially places a switch in a first state coupling a source voltage to the power-up pull resistors and in a second state coupling a common voltage to the power-up pull resistors in response to a system power-up condition.

2. The serial bus expansion circuit of claim 1, wherein a resistance of each of the power-up pull resistors is greater than a resistance of at least one external pull resistor coupled to the serial bus, thereby allowing an external pull source to override the power-up pull source.

3. The serial bus expansion circuit of claim 1, wherein the bus distribution circuit is a multiplexer.

4. The serial bus expansion circuit of claim 1, further comprising:
- a serial bus input in the distribution controller configured for coupling to the serial bus; and
- state circuitry in the distribution controller, the state circuitry generating a control signal that is applied to the control input of the bus distribution circuit in response to a selection message received via the serial bus, the selection message being addressed to the distribution controller.

5. The serial bus expansion circuit of claim 4, wherein the state circuitry generates the control signal in response to a selection payload in the selection message.

6. A serial bus expansion circuit, comprising:
- a bus distribution circuit selectively coupling a serial bus to one of a number of serial bus outputs;
- a distribution controller having a control output coupled to a control input of the bus distribution circuit;
- a number of power-up pull resistors coupling each of the serial bus outputs to a power-up pull source;
- a serial bus input in the distribution controller configured for coupling to the serial bus;
- state circuitry in the distribution controller, the state circuitry generating a control signal that is applied to the control input of the bus distribution circuit in response to a selection message received via the serial bus, the selection message being addressed to the distribution controller; and
- wherein the state circuitry applies the control signal to the control input of the bus distribution circuit upon an occurrence of an acknowledge bit in the selection message.

7. A system for serial bus expansion, comprising:
- means for selecting one of a number of devices to be coupled to a serial bus, wherein each of the devices is capable of communicating on the serial bus;
- means for selectively coupling the serial bus to one of the number of devices; and
- means for sequentially pulling a voltage potential of each of a number of serial bus inputs of the respective devices to a predefined source voltage potential and then to a predefined common voltage potential upon an occurrence of a system power-up condition.

8. The serial bus expansion circuit of claim 7, wherein the means for sequentially pulling the voltage potential of each of the number of serial bus inputs of the respective devices to the predefined source voltage potential and then to the predefined common voltage potential upon the occurrence of the system power-up condition further comprises a number of power-up pull resistors coupling each of the serial bus inputs to a power-up pull source.

9. The serial bus expansion circuit of claim 8, wherein the power-up pull source is a switch that toggles between a predefined voltage source and a predefined common voltage source.

10. The serial bus expansion circuit of claim 7, wherein the means for selecting one of the number of devices to be coupled to the serial bus further comprises means for generating a control signal based upon a selection message received via the serial bus and for applying the control signal to the means for selectively coupling the medal bus to one of the number of devices to direct a coupling of the one of the devices to the serial bus.

11. The system of claim 10, wherein the means for applying the control signal to the means for selectively coupling the serial bus to one of the number of devices further comprises means for applying the control signal to the means for selectively coupling the serial bus to one of the number of devices during an occurrence of an acknowledge bit in the selection message.

12. A serial bus expansion method, comprising:
- providing a bus distribution circuit to selectively couple a serial bus to one of a number of serial bus outputs;
- determining a select one of the serial bus outputs to which the serial bus is to be coupled;
- controlling the bus distribution circuit to couple the serial bus to the select one of the serial bus outputs;
- providing a number of power-up pull resistors that couple each of the serial bus outputs to a power-up pull source, the power-up pull source alternatively coupling each of the power-up pull resistors to a source voltage and a common voltage;
- coupling each of the power-up pull resistors to a source voltage in response to a system power-up condition; and
- subsequently coupling each of the power-up pull resistors to a common voltage.

13. The serial bus expansion method of claim 12, wherein the step of providing a number of power-up pull resistors that couple each of the serial bus outputs to a power-up pull source further comprises the step of providing for a resistance of each of the power-up pull resistors that is greater than a resistance of at least one external pull resistor coupled to the serial bus, thereby allowing an external pull source to override the power-up pull source.

14. A serial bus expansion method, comprising:
- providing a bus distribution circuit to selectively couple a serial bus to one of a number of serial bus outputs;
- determining a select one of the serial bus outputs to which the serial bus is to be coupled;
- controlling the bus distribution circuit to couple the serial bus to the select one of the serial bus outputs by applying a control signal to a control input of the bus distribution circuit concurrently with an occurrence of an acknowledge bit in a selection message transmitted over the serial bus; and
- providing a number of power-up pull resistors that couple each of the serial bus outputs to a power-up pull source.

* * * * *

UNITED STATES PATENT AND TRADEMARK OFFICE
CERTIFICATE OF CORRECTION

| | | |
|---|---|---|
| PATENT NO. | : 6,874,050 B2 | |
| APPLICATION NO. | : 10/051478 | |
| DATED | : March 29, 2005 | |
| INVENTOR(S) | : Wayne A. Tangen | |

It is certified that error appears in the above-identified patent and that said Letters Patent is hereby corrected as shown below:

IN THE CLAIMS

Claim 10, Column 8, line 10, delete "medal" and insert therefor --serial--

Signed and Sealed this

Twenty-seventh Day of May, 2008

JON W. DUDAS
*Director of the United States Patent and Trademark Office*